Sept. 15, 1936.　　　W. H. LEWIS　　　2,054,225
AUXILIARY WHEEL
Filed Sept. 26, 1934　　2 Sheets-Sheet 1

Inventor
William H. Lewis,

By Clarence A. O'Brien
Attorney

Sept. 15, 1936.  W. H. LEWIS  2,054,225
AUXILIARY WHEEL
Filed Sept. 26, 1934  2 Sheets-Sheet 2
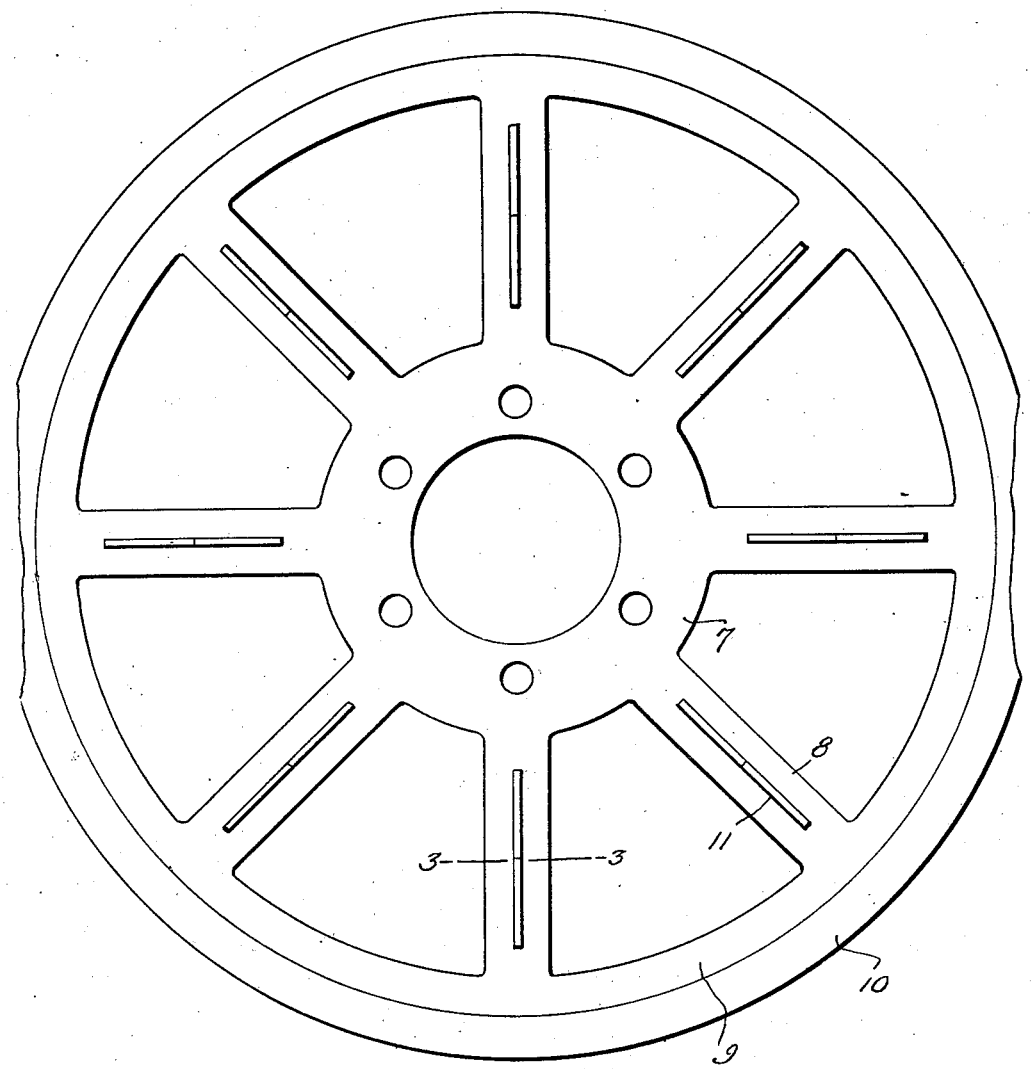
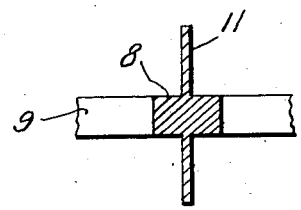
Inventor
William H. Lewis,
By Clarence A. O'Brien
Attorney Patented Sept. 15, 1936

2,054,225

UNITED STATES PATENT OFFICE 2,054,225

AUXILIARY WHEEL

William H. Lewis, Newburgh, N. Y.

Application September 26, 1934, Serial No. 745,617

5 Claims. (Cl. 301—36)

The present invention relates to an auxiliary wheel used as a safety wheel for double tire wheels on trucks, buses and the like.

The object of the invention resides in the provision of a wheel mounted between the tires for the purpose of preventing blow outs from an increased load on one of the two tires when for some cause the other tire is deflated and ceases to carry its share of the load.

Another very important object of the invention resides in the provision of an auxiliary wheel of this nature which will prevent accidents in case of blow outs in both tires.

Another very important object of the invention resides in the provision of a wheel provided with means for increasing the circulation of air between the two tires to maintain them at a cooler temperature and thereby reducing the hazard of blow outs.

With the above and numerous other objects in view as will appear as the description proceeds, the invention consists in certain novel features of construction, and in the combination and arrangement of parts as will hereinafter be more fully described and claimed.

In the drawings:

Figure 2 is a side elevation of the auxiliary wheel, and

Figure 3 is a detail section therethrough taken substantially on the line 3—3 of Figure 2.

Figure 1:
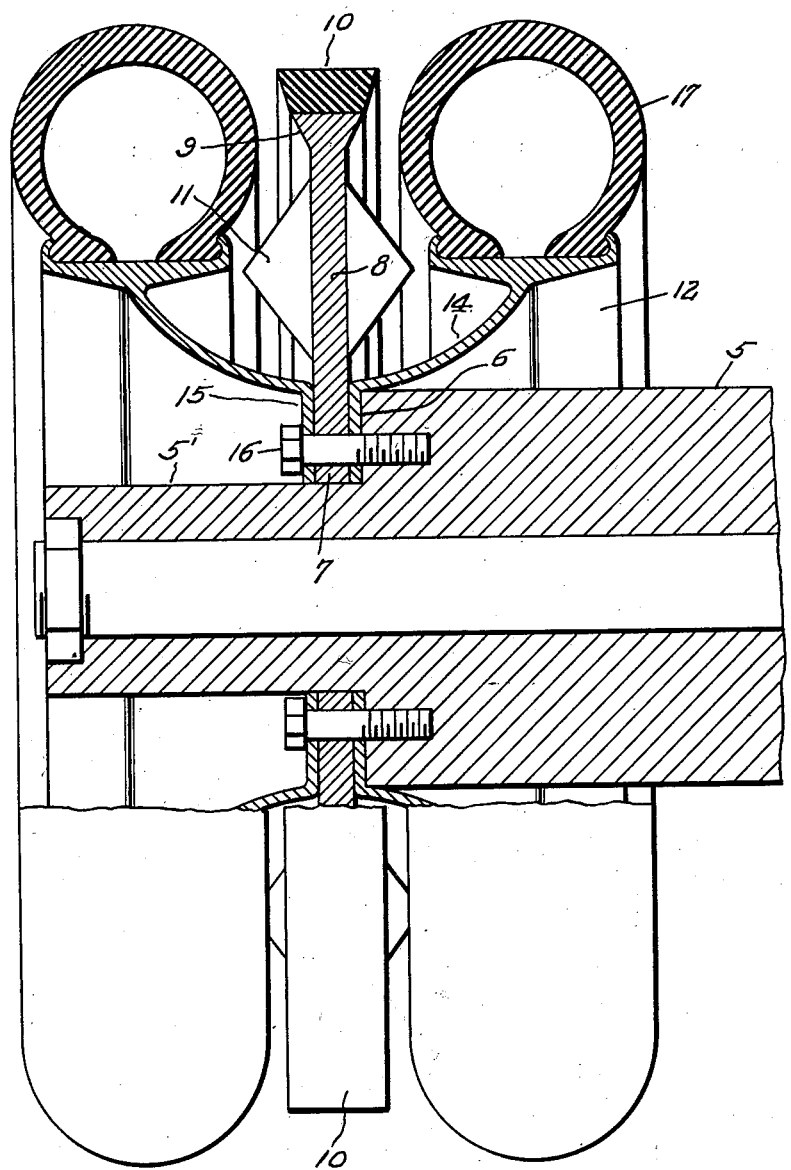
Figure 1 is a sectional elevation of an assemblage embodying the features of my invention.

Referring to the drawings in detail it will be seen that the numeral 5 denotes a hub to which my assembly is bolted against the shoulder 6 and about the reduced portion 5'. The auxiliary wheel comprises a flat body having hub portion 7 with spokes 8 radiating therefrom and merging into rim 9 on which is mounted a cushion tire 10. A plurality of triangularly shaped fins 11 project laterally from the spokes 8, a pair on each spoke, one on each side thereof. Rims 12 are disposed one on each side of the auxiliary wheel and have webs 14 curving inwardly toward the auxiliary wheel and terminating in flanges 15 one to each side of the hub 7 of the wheel and bolts 16 secure the flanges 15, and the hub 7 securely against the shoulder 6. Tires 17 are mounted on the rims and when inflated have diameters greater than the diameter of the tire 10. The diameter of the auxiliary wheel is greater than the diameter of the rims 12. It will be seen that if one of the tires becomes deflated, then the auxiliary wheel comes into use; or if both tires become deflated then the auxiliary wheel comes into use. In this way accidents are prevented as well as blow outs. The fins 11 cause the circulation of air which assist greatly in cooling the tires keeping them below what may be considered a normal temperature. The fins on a rear wheel assembly, would also assist in cooling brake bands.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An assembly of the class described comprising a pair of like disc wheels including rims carried on the peripheries of inwardly converging webs, pneumatic tires carried by said rims, an auxiliary wheel between the rims and webs having a diameter greater than the rims, said auxiliary wheel comprising a flat body, a cushion tire carried by said auxiliary wheel, the diameter of the pneumatic tires when properly inflated being greater than the diameter of the cushion tire, a wheel hub, and means for securing all of said wheels in fixed relation to the wheel hub.

2. An assembly of the class described comprising a pair of like disc wheels including rims carried on the peripheries of inwardly converging webs, pneumatic tires carried by said rims, an auxiliary wheel between said rims and webs, said auxiliary wheel having a diameter greater than the diameter of said rims, a cushion tire carried by said auxiliary wheel, the diameter f said pneumatic tires when properly inflated being greater than the diameter of said cushion tire, the sides of said cushion tire being spaced from said pneumatic tires, said three wheels being separate, a wheel hub and means for securing said three wheels to said hub.

3. An assembly of the class described comprising a hub, said hub having an abutment, a pair of separate and like disc wheels mounted on said hub, said wheels having inwardly converging webs, substantially parallel flanges and spaced rims, pneumatic tires carried on said rims, an auxiliary wheel mounted on said hub and independent of said disc wheels, the flanges of said disc wheels being spaced from each other, and said auxiliary wheel located therebetween, common means for demountably securing said three wheels to said hub, the diameter of said pneumatic tires when properly inflated being greater than the diameter of said cushion tire, and the diameter of said auxiliary wheel being greater than the diameter of said disc wheels.

4. An assembly of the class described comprising a pair of like disc wheels including rims carried on the peripheries of inwardly converging webs, pneumatic tires carried by said rims, an auxiliary wheel between said rims and webs, said auxiliary wheel having a diameter greater than the diameter of the rims, a cushion tire carried by said auxiliary wheel, the diameter of the pneumatic tires when properly inflated being greater than the diameter of the cushion tire, a wheel hub, said three wheels being separate, means for securing said three wheels to said wheel hub, with that portion of said auxiliary wheel near said hub being in the same vertical plane with said cushion tire.

5. An assembly of the class described comprising a pair of like disc wheels including rims carried on the peripheries of inwardly converging webs, pneumatic tires carried by said rims, an auxiliary wheel between said rims and webs, said auxiliary wheel having a diameter greater than the diameter of said rims, a cushion tire carried by said auxiliary wheel, the diameter of said pneumatic tires when properly inflated being greater than the diameter of said cushion tire, the sides of said cushion tire being spaced from said pneumatic tires, said three wheels being separate, a wheel hub and means for securing said three wheels to said hub, and a plurality of vanes for the circulation of air carried by said auxiliary wheel.

WILLIAM H. LEVIS.